United States Patent Office 2,739,139
Patented Mar. 20, 1956

2,739,139

POLYAMIDES CONTAINING CHROMIUM SALTS AS LIGHT STABILIZERS

Rudolf Gabler, Tamins, Graubunden, and Paul Kümmel, Ems, Graubunden, Switzerland, assignors to Inventa A. G., Forschung und Patentverwertung Luzern, Lucerne, Switzerland No Drawing. Application July 31, 1952, Serial No. 301,988

13 Claims. (Cl. 260—45.75)

This invention is a novel method of protecting polyamides or products thereof against serious photochemical impairment. These compounds may be considered as affording the structural materials from which various products may be composed or manufactured, and the general purpose of the invention is to reduce and minimize the harmful effects and other deterioration which may result from the exposure of the products to sunlight or other actinic rays. The compounds mentioned may be varied within the principles of the invention, and the compounds used may be what are known as super-polyamides for use in the formation of various practical articles or commodities such as fibres, threads, foils, tubes, profiled pieces and the like, rigid or pliant.

It was heretofore known that structures made of polyamides are very considerably impaired by the action of sunlight or other highly actinic rays whether direct or through a transmitting layer or glass, even after a relatively short exposure. The resulting damage appears, inter alia, as a substantial reduction in the properties of strength and elasticity of the structure. This is particularly the case if thread-like structures of polyamides contain the agent titanium white, which is usually added for obtaining a matt effect in artificial fibres. The photochemical damage to matt textile polyamide materials is so great that the use of textile fabrics made from such materials is scarcely possible for certain purposes, for example, for tents, sail cloths, flags and so forth.

Further, it was already described that a theoretical amount of protection against photochemical effect can be obtained in the cases of certain fibres, threads or textile materials of polyamides by treating them with a solution of a dichromate, with subsequent reduction to the cationic chromium salt. Such process has been mentioned, for example, in the British Patent No. 649,481.

Referring now to the invention hereof it has been discovered and determined by applicants that the protection of polyamides from the ill effects of strong light can be carried out in a considerably more simple and economical manner than heretofore known and used, namely, by adding selectively a chromium-containing component to the monomeric starting materials before polymerization, and carrying out the polymerization to completion in the presence of the chromium-containing inhibitor. To the carrying out of the purposes and useful results of the invention is characterized, in an important aspect, by the features that a small amount of a chromium salt is added to the monomeric starting material before the polymerization, and the polymerization is carried out to completion in the presence of this salt.

It was surprising to discover that the course and the results of the polymerization operation were, in general, not substantially interfered with by the presence of chromium salts, even when the proportion of the chromium-containing component or agent amounted to as much as 0.10 percent, or even more. Also, the finished polymerization products were unexpectedly found to exhibit, as compared with samples which were not treated with the chromium material but were otherwise prepared in a similar general manner, no measurable or appreciable differences as regards such properties as melting point, degree of polymerization, viscosity, solubility, hardness, tensile strength and so forth. Only with higher dosages of the chromium components, in general with additions of more than 0.10 percent, is there a deepening of the color corresponding to the color of the chromium salt itself. In some cases a deepening in color or a change in shade occurs which point to a complexion formation between the chromium component and the polymeric substance. If the addition of chromium salt is limited to the optimum quantity which is sufficient for obtaining the optimum protection against the effect of light, namely from about 0.01 to 0.05 percent of chromium, a coloration of the polymerizate can no longer be discerned or recognized, from which it follows that colorless or white products with increased stability under light can be directly manufactured by the process in accordance with this invention.

The polyamides dealt with by this invention, when polymerized in the presence of the chromium salts, are characterized by a considerably increased resistance to the effect of light. As an indication of this there is given the following table which shows the improved photochemical resistance of a fibre of poly-$\epsilon$-caprolactam. The fibre was spun from a polyamide to the monomeric starting material of which, namely the caprolactam, there was added 0.05 percent of chromium in the form of chromium (III) fluoride.

The table gives a comparison between the value for the extension and the strength of unexposed material and material which has been exposed for 100 hours to direct sunlight. It indicates certain characteristics or properties of the materials as to the tensile strength thereof to resist rupture, and their elongation, resulting from the pretreatments applied.

TABLE 1

|  | Breaking Strength | | Extension | |
|---|---|---|---|---|
|  | Unexposed, g./den. | After 100 hours sunlight | Unexposed, percent | After 100 hours sunlight, percent |
| Fibre (glossy) normal. | 4.95 | 4.26 g./den. (−14%) | 25.9 | 18.4 |
| Fibre (matt) normal. | 4.96 | 2.61 g./den. (−47%) | 24.5 | 16.1 |
| Fibre (glossy) 0.05% chromium. | 5.02 | 4.72 g./den. (−6%) | 26.2 | 23.0 |
| Fibre (matt) 0.05% chromium. | 4.82 | 3.54 g./den. (−25%) | 25.7 | 21.3 |

The ability to work up and produce satisfactory synthetic fibres from polyamides is in no way impaired by the percentage content, or the amount, of chromium salt which is necessary for producing a sufficient or required protection against the impairment by exposure to light. It is noteworthy that this fact holds good also for the cold, as well as the hot, stretching process, which latter is known to be particularly sensitive, and to which the above mentioned and certain other types of fibre must be subjected. Thus, for example, the number of rejects due to thread and fibre breakages, in the case of stretching of poly-$\epsilon$-caprolactam material which has been polymerized with an addition of 0.05 percent of chromium acetate, is not greater than the defects suffered with a similar yarn which does not contain this addition.

Of course, the improved protection against light thus achieved extends not only to thread-like structures of polyamides, but to objects of all kinds and forms, no matter whether they are produced by a continuous forming process such as melt-spinning, extrusion, rolling, drawing and the like, or by a discontinuous process such as by die casting, pressing in molds or machining. For these products an improved resistance to the harmful effects of sunlight is desirable and even essential for certain purposes, and is provided by the invention.

The protection against actinic light which is obtained by the process of this invention is a lasting and durable protection and is not affected seriously by the usual after-treatments such as washing, drying, smoothing, dyeing and the like. Conversely such after-treatment process steps are substantially completely unaffected by the presence of the chromium content of the polyamide. The two method features, of separate utility, are mutually innocuous.

For carrying out the method of the invention the relative solubilities of the monomeric starting material and the chromium component are important. Water-soluble chromium salts can be added without difficulty to water-containing solutions or melts, such as are used for example in the poly-condensation of the polyamide.

Another way of introducing the difficultly soluble chromium salt into the monomer consists in mixing a concentrated aqueous solution of the chromium salt with the liquid monomer and thereafter evaporating the water. In many cases, especially with lactams, it is possible to keep the chromium component in solution in this way.

In performing the method of the invention there is used for the chromium component a salt which preferably is an inorganic or organic salt, advantageously of trivalent chromium, as chromium (III) fluoride. Salts of divalent and hexavalent chromium, as well as complex chromium compounds, can also be used. The former, however, by subsequent oxidation or reduction are transformed wholly or partly into trivalent chromium salts. Examples of this change in valency of chromium are the chromates and dichromates which are reduced during the polymerization process or operation. The salt-forming part of the chromium compound is of less importance than the remainder for protecting polyamides from the impairing effects of the light.

On the other hand, it has been found that the presence of certain other metals or agents can in some cases increase the inhibiting effect of the chromium, but that such agents or groups can also in other cases reduce the effect considerably. To the first group belong certain salts of copper and manganese; such as $CuBr_2$ or $MnBr_2$; to the latter group certain other salts, as of iron, cobalt and nickel, such as $FeCl_3$ or $CoSO_4$ or $NiSO_4$. Many of these metal salts develop their inhibiting effect only in cooperation with chromium salts and are less effective, or even entirely ineffective, by themselves.

The following non-limitative examples of the invention are given, and in these examples the parts of ingredients etc. are given by weight.

*Example 1*

As a first ingredient solution, about 100 parts of ε-caprolactam are dissolved in 5 parts of water at 80° C. A second solution consists of 5 parts of water containing about 0.3 part of titanium dioxide in suspension and about 0.05 part of chromium fluoride dissolved in it. With stirring, this solution is mixed into the caprolactam solution. For the polymerizing operation this entire mixture is autoclaved at about 250° C.

The polymerization is first carried out under pressure of the order of 600 p. s. i. for about two hours at 250° C., the steam and vapors are then released and the polymerization is carried on without raised pressure for a further period of about eight hours at about the same temperature.

By these steps a white polymerisate is obtained, and this light resistant compound can be spun without difficulty to form a polyamide yarn of any desired titre. Such a spun and cold-stretched yarn of 60 denier (24 threads) exhibits, after exposure for 100 hours to sunlight, a loss of strength of not more than about 25 percent as compared with a drop of 50 percent or greater in a chromium-free polymerisate.

*Example 2*

As a main ingredient 100 parts of the adipic acid salt of hexamethylenediamine is liquified at about 100° C. in 30 parts of water. After the further addition of about 0.3 parts of titanium dioxide, and about 0.03 part of chromium acetate and about 0.01 of manganese acetate, the mixture is gradually heated to about 280° C. in an atmosphere of nitrogen in a vessel made of resistant material such as non-rusting steel. The water is thus evaporated and the mass assumes a viscous consistency.

The polymerization is carried to completion for about a further eight hours at about 280° C., and a colorless polymerisate is obtained which is suitable to be directly spun into threads and can then be cold-stretched.

A yarn of 30 denier (12 threads) produced according to this example exhibits, after exposure to sunlight for 300 hours, a decrease in strength of about 28 percent and a reduction in extension of about 32 percent as compared with an unexposed yarn. With a similar yarn, but without the addition of the chromium material and the manganese salt, the reduction in strength, with the same period of exposure, amounted to about 65 percent and the reduction in extension to about 70 percent; thus establishing the high practical value of the protective treatment of this invention.

What we claim is:

1. The method of producing synthetic linear polyamides with increased light stability which comprises forming in the presence of water a solution of linear polymer-forming monomeric material of the class consisting of, cyclic anhydrides (lactam) derived from monoaminecarboxylic acids and mixtures of diamines and dicarboxylic acids, mixing said solution with an aqueous solution of a chromium salt which is stable under the conditions of the polymerization, and then heating the mixture until a spinnable product is formed containing permanently therein a chromium composition as a light stabilizer.

2. The method of producing synthetic linear polyamides as described in claim 1, wherein the polyamide is polyhexamethylene adipamide.

3. The method of producing synthetic linear polyamides as described in claim 1, wherein the polyamide is poly-ε-caprolactam.

4. The method of producing synthetic linear polyamides as described in claim 1, wherein the chromium salt is added in an amount of from 0.001% to 0.1% by weight of the total solid content.

5. The method of producing synthetic linear polyamides as described in claim 1, wherein the chromium salt is chromium (III) fluoride.

6. The method of producing synthetic linear polyamides as described in claim 1, wherein the chromium salt is chromium (III) acetate.

7. An article of predetermined size and shape made of linear synthetic polyamide wherein the amide groups are an integral part of the polymer chain, said polyamide having permanently incorporated therein a light-stabilizing amount of a chromium salt.

8. A spun yarn of linear synthetic polyamide wherein the amide groups are an integral part of the polymer chain, said polyamide having permanently incorporated therein a light-stabilizing amount of a chromium composition.

9. A method of preparing a light-stabilized linear polyamide of the type wherein the amide groups are an integral part of the polymer chain, which method comprises polymerizing the monomeric components of the polyamide in the presence of a chromium salt of the class consisting of chromium fluoride and chromium acetate.

10. A method of preparing a light-stabilized synthetic liner polyamide of the type wherein the amide groups are an integral part of the polymer chain, which method comprises polymerizing the monomeric components of the polyamide in the presence of a chromium salt to form the polyamide with the chromium from said salt permanently incorporated therein.

11. A method of preparing a light-stabilized synthetic linear polyamide as described in claim 10, wherein the chromium salt is a trivalent chromium salt.

12. A method of preparing a light-stabilized synthetic linear polyamide of the type wherein the amide groups are an integral part of the polymer chain, which method comprises polymerizing the monomeric components of the polyamide in solution in the presence of an aqueous solution of a chromium salt to form the polyamide with the chromium from said salt permanently incorporated therein.

13. The method of producing fibers from a light-stabilized linear synthetic polyamide of the type wherein the amide groups are an integral part of the polymer chain, which method comprises polymerizing the monomeric components of the polyamide in solution in the presence of a chromium salt, to cause said chromium salt to become permanently incorporated in the resulting polyamide, and working the resulting polyamide into fibers.

References Cited in the file of this patent

UNITED STATES PATENTS 2,223,304   Lazier _____ Nov. 26, 1940